United States Patent [19]

Sutherst et al.

[11] Patent Number: 5,526,604
[45] Date of Patent: Jun. 18, 1996

[54] INSECT TRAP WITH A HOUSING AND WALK THROUGH PASSAGE FOR REMOVING INSECTS FROM ANIMALS

[75] Inventors: Robert W. Sutherst, Chelmer; Stephen R. Tozer, Fig Tree Pocket, both of Australia

[73] Assignee: Commonwealth Scientific and Industrial Research Organisation, Canberra, Australia

[21] Appl. No.: 263,347

[22] Filed: Jun. 21, 1994

[30] Foreign Application Priority Data

Jun. 24, 1993 [AU] Australia .................. 41487/93

[51] Int. Cl.[6] ................................. A01M 1/10
[52] U.S. Cl. ................................. 43/107; 119/650
[58] Field of Search ............ 43/107, 118, 132.1, 43/133; 119/156, 157, 159

[56] References Cited

U.S. PATENT DOCUMENTS

| | | | |
|---|---|---|---|
| 1,258,763 | 3/1918 | Girvin | 43/132.1 |
| 1,427,204 | 8/1922 | Gibbons | 119/156 |
| 1,569,904 | 1/1926 | Wright | 119/156 |
| 1,577,435 | 3/1926 | Abott | 119/156 |
| 1,635,951 | 7/1927 | Newcomer | 119/156 |
| 2,141,457 | 12/1938 | Sudlow | 43/118 |
| 5,205,063 | 4/1993 | Sutherst et al. | 43/107 |

FOREIGN PATENT DOCUMENTS 556832  2/1957  Italy ........................ 119/156

*Primary Examiner*—Jack W. Lavinder
*Assistant Examiner*—Jeanne M. Elpel
*Attorney, Agent, or Firm*—Griffin, Butler, Whisenhunt & Kurtossy

[57] ABSTRACT

An insect trap (10) including a housing having a support frame (11), a skin (18) of flexible transparent or translucent material attached to and substantially covering the support frame (11) to provide a housing interior (17A) which is substantially totally exposed to sunlight. A walk through passage (16A) extends through the housing interior (17A) and a brush (33A, 37A) forms a dense curtain in the walk through passage (16A) for brushing flies off an animal passing through the housing interior (17A) in the walk through passage (16A). One or more ceiling sheets or panels (20) are located in the housing which are spaced from the flexible skin (18) to define an enclosed space (57) which functions as a heat trap for insects. The enclosed space (57) has at least one access passage (22A, 25) which is restricted in dimensions compared to the enclosed space (57), whereby insects parted from the animal by the brush (33, 37A) are attracted to the heat trap for subsequent desiccation after exposure to sunlight passing through the flexible skin (18).

13 Claims, 8 Drawing Sheets

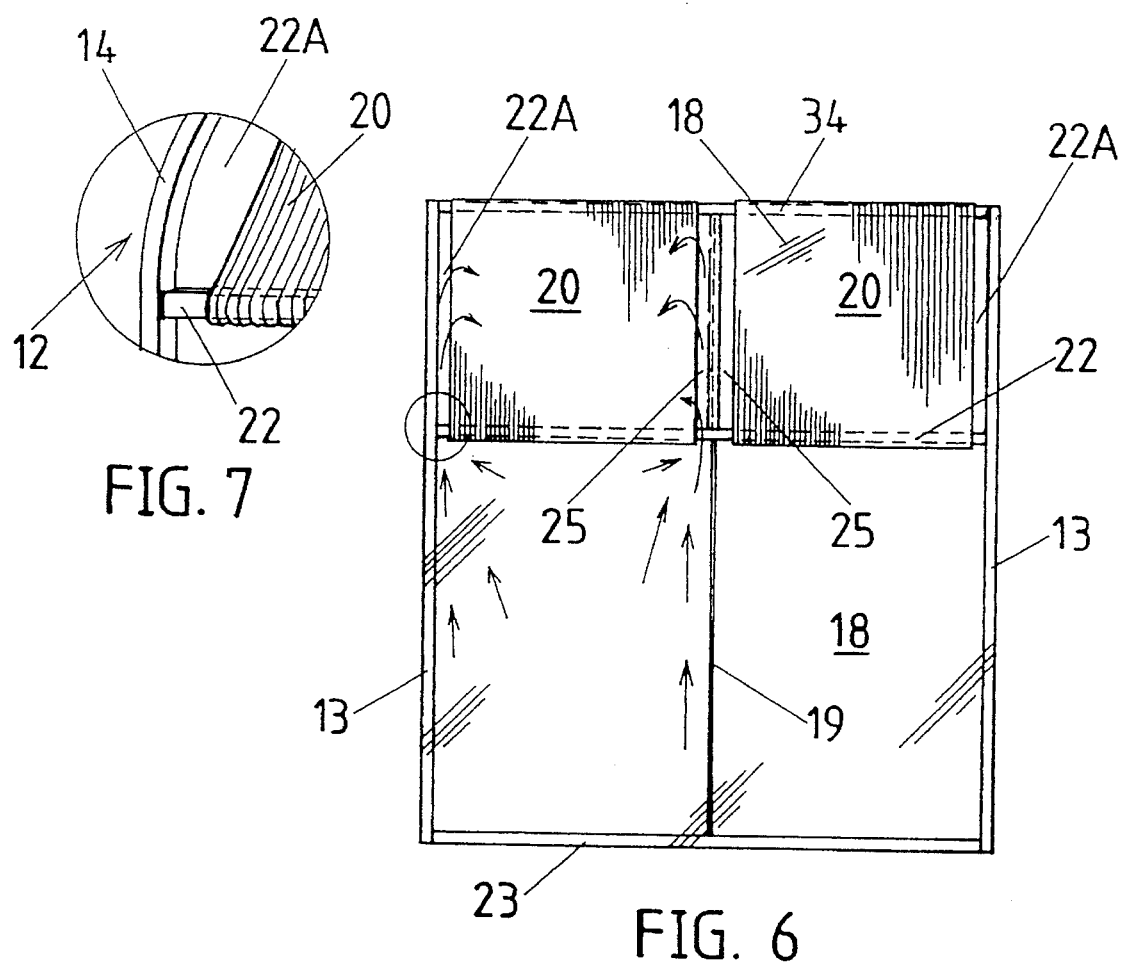
FIG. 7
FIG. 6
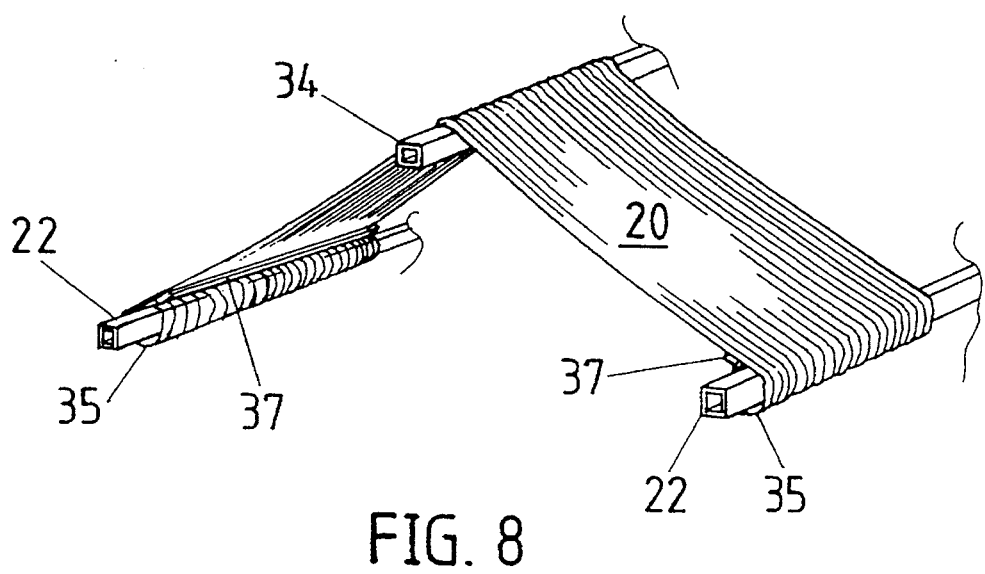
FIG. 8

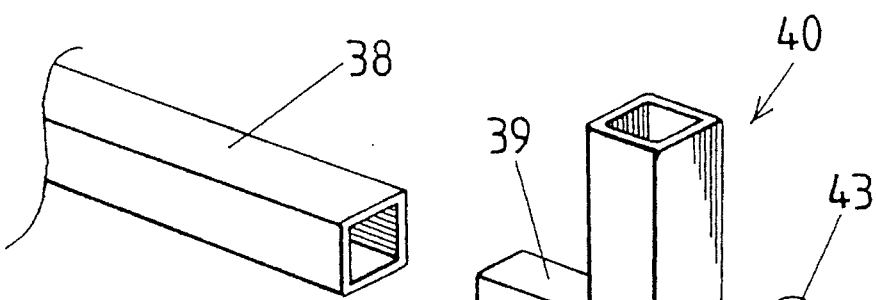
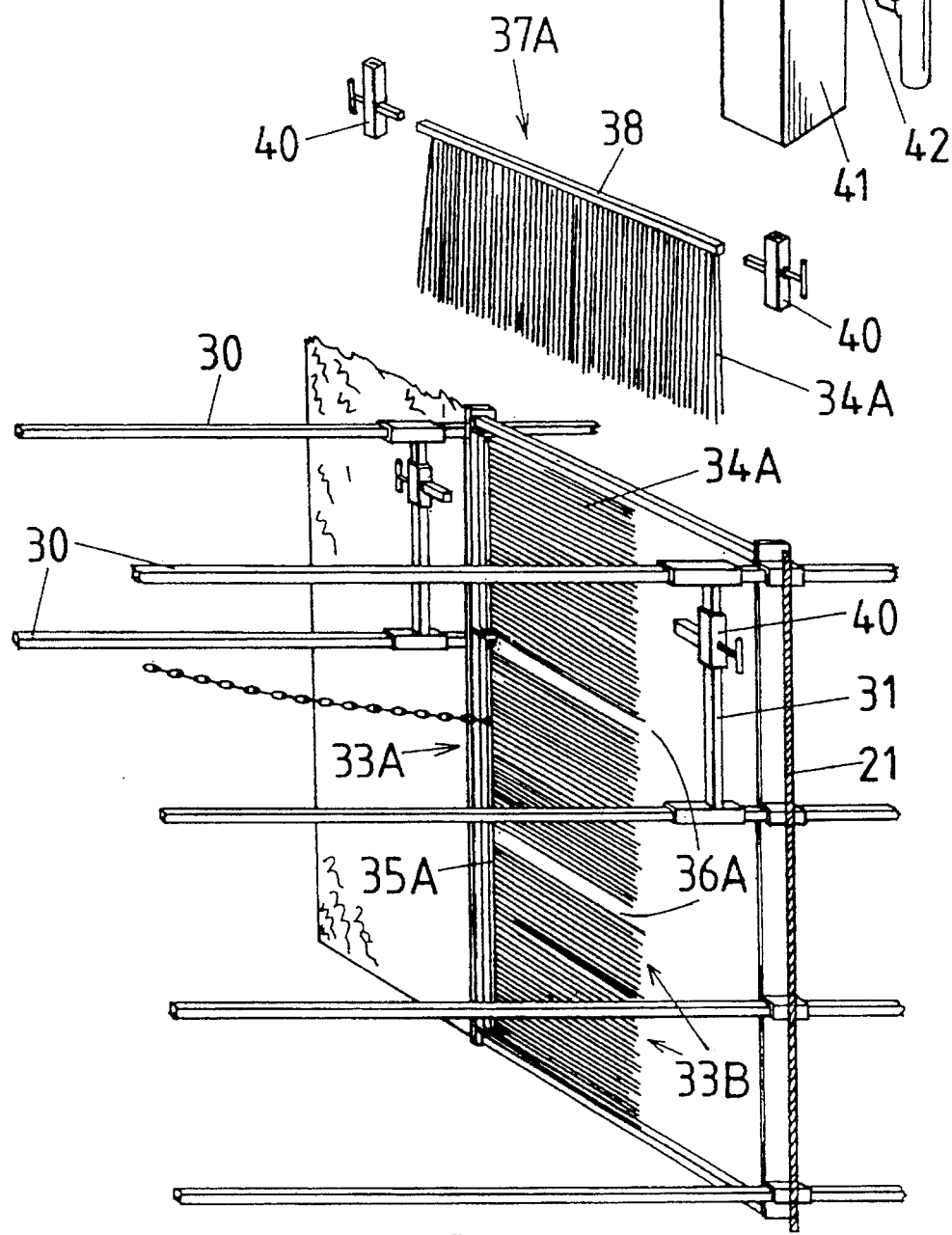

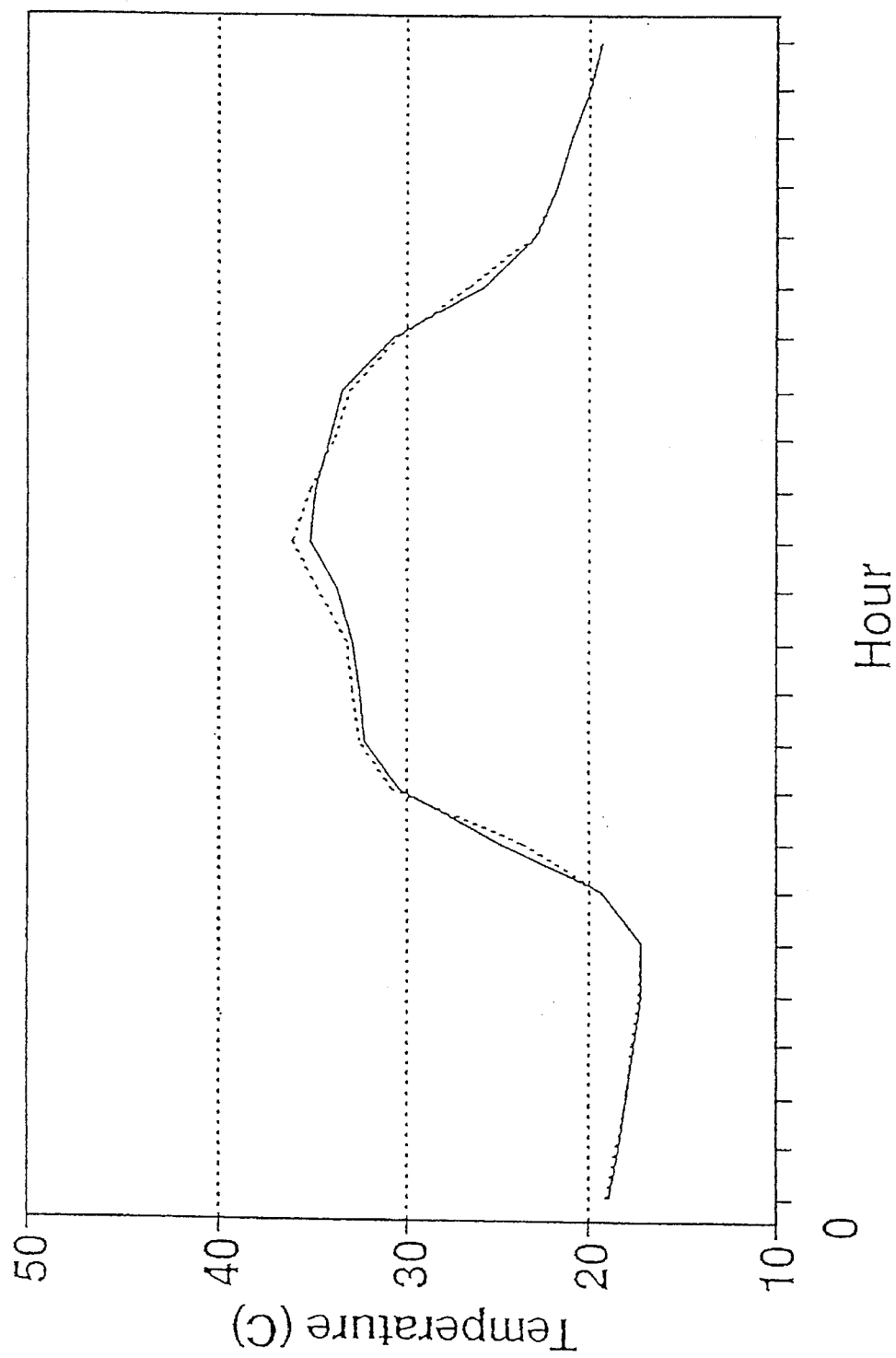
Fig 13. Mean hourly temperatures in the bottom portion of the buffalo fly trap with (—) and without (- -) a false ceiling.

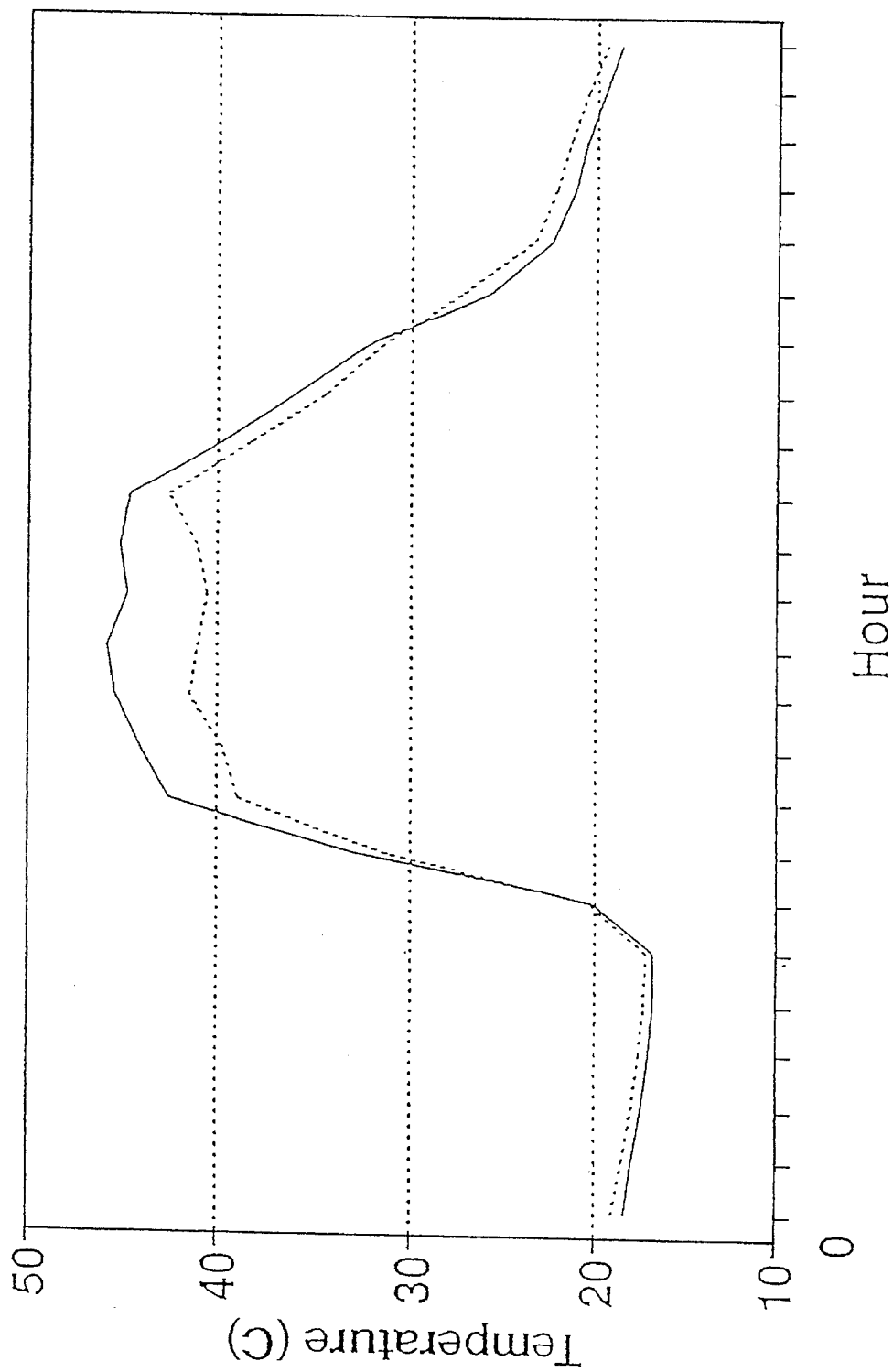
Fig 14. Mean hourly temperatures in the top portion of the buffalo fly trap with (—) and without (- -) a false ceiling.

INSECT TRAP WITH A HOUSING AND WALK THROUGH PASSAGE FOR REMOVING INSECTS FROM ANIMALS

DESCRIPTION

BACKGROUND OF THE INVENTION

1. Technical Field

This invention relates to an insect trap which may be utilised specifically for control of buffalo fly or horn fly. However, it will be appreciated that the insect trap of the invention is not limited to this particular application and thus could be utilised for control of flying insects on other animals.

2. Background Art

Reference may be made to U.S. Pat. No. 5,205,063 which comprises relevant prior art in relation to this invention and which describes an insect trap including a housing having a support frame; a skin of flexible transparent or translucent material attached to and substantially covering the support frame to thereby provide a housing interior which is substantially totally exposed to sunlight; a walk through passage extending through the housing interior, said flexible skin being spaced from said walk through passage to provide a spacing in said housing interior, and at least one partition being located in said spacing, and brush means forming a dense curtain in said walk through passage for brushing flies off an animal passing through said housing interior in said walk through passage wherein said brush means is formed from dark material in contrast to said flexible skin whereby insects parted from said animal by said brush means may be attracted to said flexible skin in said housing for subsequent desiccation after exposure to the sunlight passing through said flexible skin.

One particular disadvantage of the insect trap U.S. Pat. No. 5,205,063 was that in some circumstances the flies had a tendency to fall to the ground after contact with the brush means and revive to attack the next animal passing through the walk through passage or alternatively escape from the trap through either end of the walk through passage.

Another disadvantage of the insect trap of U.S. Pat. No. 5,205,063 was that sometimes the flies would be attracted to a roof of the insect trap formed by the flexible skin and subsequently fall to the ground or escape through an adjacent end of the walk through passage because there was no effective means of retaining the flies adjacent the roof of the insect trap for subsequent death through dehydration or desiccation.

DISCLOSURE OF INVENTION

From the foregoing it can therefore be appreciated that compared to the prior art the insect trap could be made more effective in use and this is an object of the present invention.

The invention therefore provides an insect trap including a housing having a support frame; a skin of flexible transparent or translucent material attached to and substantially covering the support frame to thereby provide a housing interior which is substantially totally exposed to sunlight; a walk through passage extending through the housing interior, brush means forming a dense curtain in said walk through passage for brushing flies off an animal passing through said housing interior in said walk through passage and one or more ceiling sheets or panels located in said housing which are spaced from said flexible skin to define an enclosed space which functions as a heat trap for insects, said enclosed space having at least one access passage which is restricted in dimensions compared to said enclosed space whereby insects parted from said animal by said brush means are attracted to said heat trap for subsequent desiccation after exposure to sunlight passing through the flexible skin.

The brush means may comprise an array of monofilaments or fibres which are attached to a support and hang vertically downwardly or extend laterally outwardly to contact the body of the animal as the animal passes through the chamber. Suitably each fibre or filament may have a thickness of 0.5 mm to 4.0 mm. If desired there may be provided a number of arrays of monofilaments whereby a first array of monofilaments may contact the back of the animal and a second array of monofilaments contact the sides and upper body of the animal.

If desired, instead of the monofilaments, the brush means may comprise a dense curtain of dark shade cloth or other suitable fabric which may include one or more or an array or plurality of curtain segments.

The skin for the chamber may be chosen from UV protected transparent or translucent plastics material such as polypropylene or other form of plastics sheet. However other appropriate translucent or transparent fabric may be utilised. The, partition(s) may also be formed from transparent or translucent material as described above for the skin or more preferably may be formed from dark coloured material, for example shade cloth which may be suitably fibre reinforced.

The support frame may have any suitable shape, for example the frame could have a pair of rows of peripheral uprights which may be spaced from each other to form the side walls of the housing interior or chamber when the skin is attached to the support frame. The support frame may also include a pair of inner rows of uprights wherein each inner row defines the walk through passage or a cattle race.

However the above arrangement is only optional. It will be appreciated that instead of the cattle race being formed as part of the chamber, the chamber could be constructed around a separate cattle race which will pass through the chamber and may extend outwardly therefrom at each end. The cattle race may comprise a preformed floor and side rails and uprights. In this arrangement the support frame for the chamber may only comprise a pair of outer rows of peripheral uprights.

The roof of the chamber may be formed in any suitable manner. In one arrangement the roof may be formed by a plurality of cross members interconnecting each peripheral upright. However while a flat or substantially planar roof may be utilized it is preferred that the roof be formed from a plurality of cross members each having a base frame member and a top arcuate frame member which may be spaced from each other and supported by the outer rows of peripheral uprights.

A rounded or arcuate roof is preferred for ease of manufacture and wind resistance.

The trap works on the principle that flies that come off animals as the animals walk through the race, being strongly attracted to light, will fly to the inside surface of the chamber where they remain trying to get out towards the light. The flies have a limited life span in hot dry conditions away from their animal hosts which they feed on about 18 times a day. The transparent or translucent sides and ceiling of the chamber allow sun light to penetrate and raise the internal temperature of the chamber to levels well above ambient, such that the flies rapidly desiccate and/or suffer heat stress causing their death from the heat within the chamber. In addition to being brushed off, flies are encouraged to leave the cattle by the dark brush means. The darkness forms a deterrent to the flies which leave the animals and fly outwards towards the light, where they encounter the transparent or translucent sides of the chamber.

In accordance with the invention the housing interior includes a generally enclosed air space beneath its roof. This may be formed by a false ceiling, that is, a sleeve of transparent or translucent material which is arranged beneath the roof of the chamber. In this arrangement, the temperature of the air within the enclosed space can rise above the temperature of the air within the remaining portion of the chamber because air flow through the enclosed space is more restricted. Consequently flies which have entered the enclosed space will be more rapidly desiccated. Surprisingly, an unexpected effect of the false ceiling is that it appears to attract the flies to move up the internal surface of the skin forming the sides of the chamber towards the upper region of the chamber and so accelerate their confinement in the enclosed space.

BRIEF DESCRIPTION OF THE DRAWINGS

Reference may be made to a preferred embodiment of the invention as shown in the attached drawings wherein:

FIG. 6 is a side view of the insect trap of FIG. 1;

FIG. 7 is a detailed perspective view of the trap of FIG. 6 showing the gap or spacing between the ceiling sheet and adjacent frame;

FIG. 8 is a perspective view showing a single ceiling sheet and its attachment to the frame of the insect trap with other ancillary structure removed for clarity;

FIG. 9 is an exploded perspective view of the brush means and showing the attachment of a side brush as well as a top brush to the frame of the insect trap;

FIG. 10 is an exploded perspective view showing the attachment of a support rail of the top brush to an associated clamp member;

FIG. 13 is a graph illustrating the temperature obtained in a bottom portion of a fly trap which is constructed in accordance with the invention compared to the temperature obtained in a bottom portion of a conventional fly trap; and FIG. 14 is a graph illustrating the temperature obtained in a top portion of a fly trap which is constructed in accordance with the invention compared to the temperature obtained in a top portion of a conventional fly trap.

BEST MODE FOR CARRYING OUT INVENTION

Figure 1:
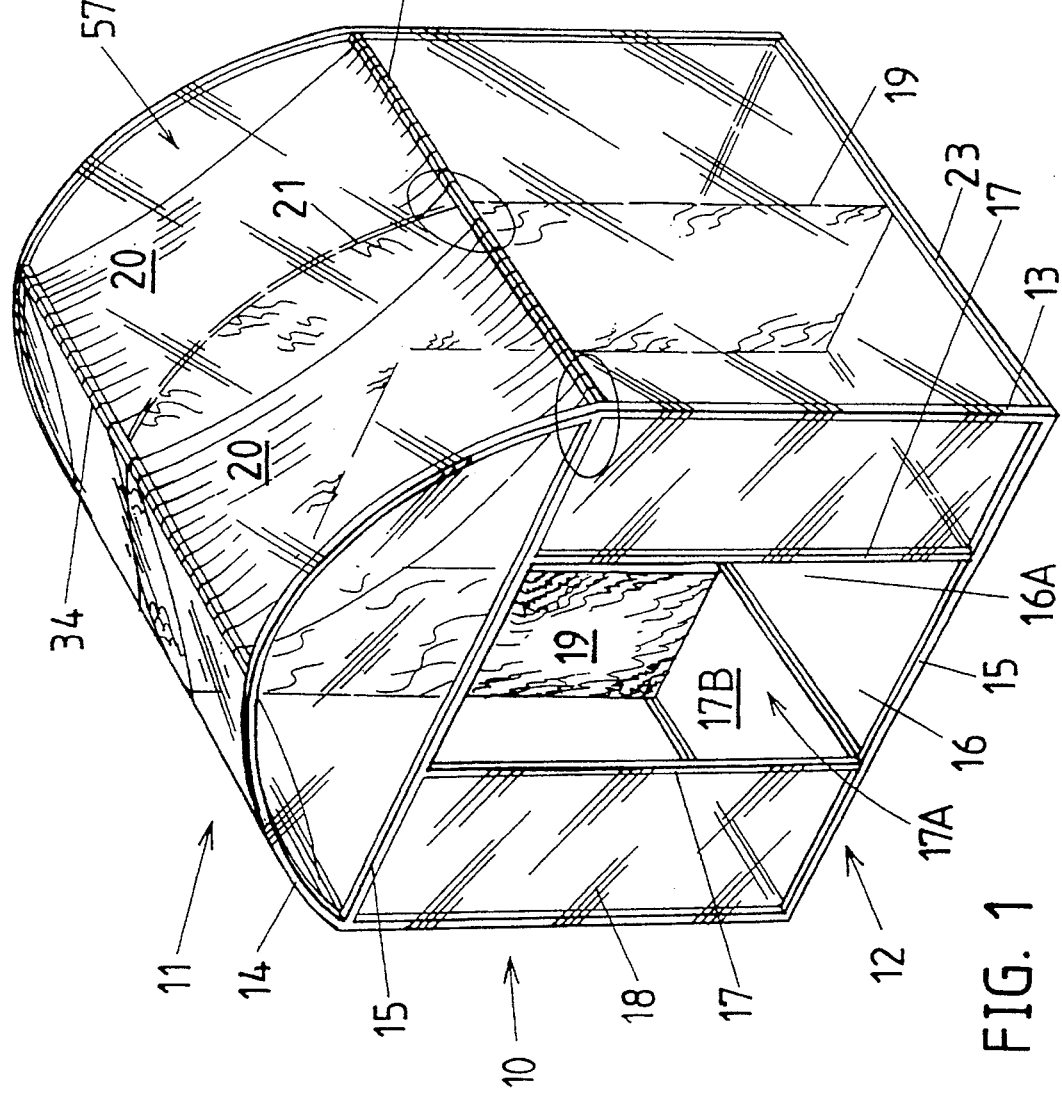
FIG. 1 is a perspective view of an insect trap constructed in accordance with the present invention.

Upon reference to FIG. 1 of the drawings, the insect trap 10 includes a housing formed by a frame 11 including opposed end frames 12 each including vertical frame members 13, arcuate frame member 14, horizontal frame members 15, accessway 16, as well as opposed frame members 17 of accessway 16. There is also provided walk through passage 16A and external flexible skin 18. There also is provided in the housing interior 17A, an internal spacing 17B between walk through passage 16 and flexible skin 18. The housing interior 17A or internal chamber may include a central retaining strip 21 formed from dark material or fabric and a pair of ceiling sheets or panels 20 attached to frame 11. There also is provided a retaining strip 21 for partition 19 which may be attached to partition 19 by a VELCRO (hook/loop mechanical locking textile type attachment or other form of releasable attachment. There is also shown top longitudinal frame member 22 and bottom longitudinal frame member 23.

Figure 2:
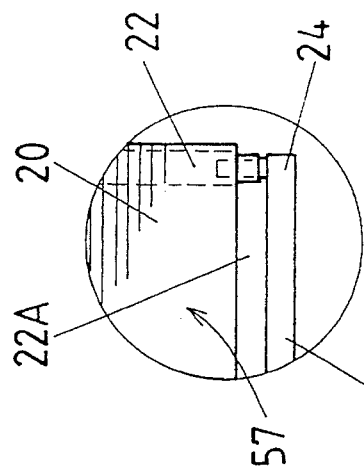
FIG. 2 is a detailed plan view of a gap or spacing between the frame of the insect trap and a ceiling sheet.

FIG. 2 shows a detailed view of a gap or spacing 22A between arcuate frame member 14 and an adjacent ceiling sheet 20 as well as bolt 24 interconnecting end frames 12 to frame member 22.

Figure 3:
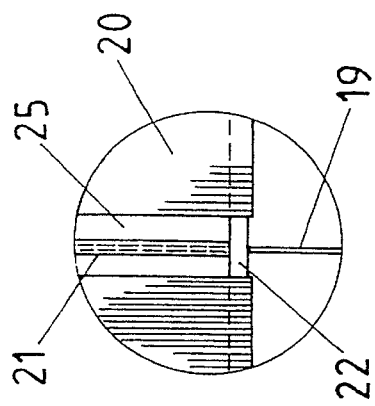
FIG. 3 is a view showing a gap or spacing between the partition and an adjacent ceiling sheet.

FIG. 3 shows a detailed view of a spacing or gap 25 between ceiling sheet 20 and partition 19.

Figures 4, 5:
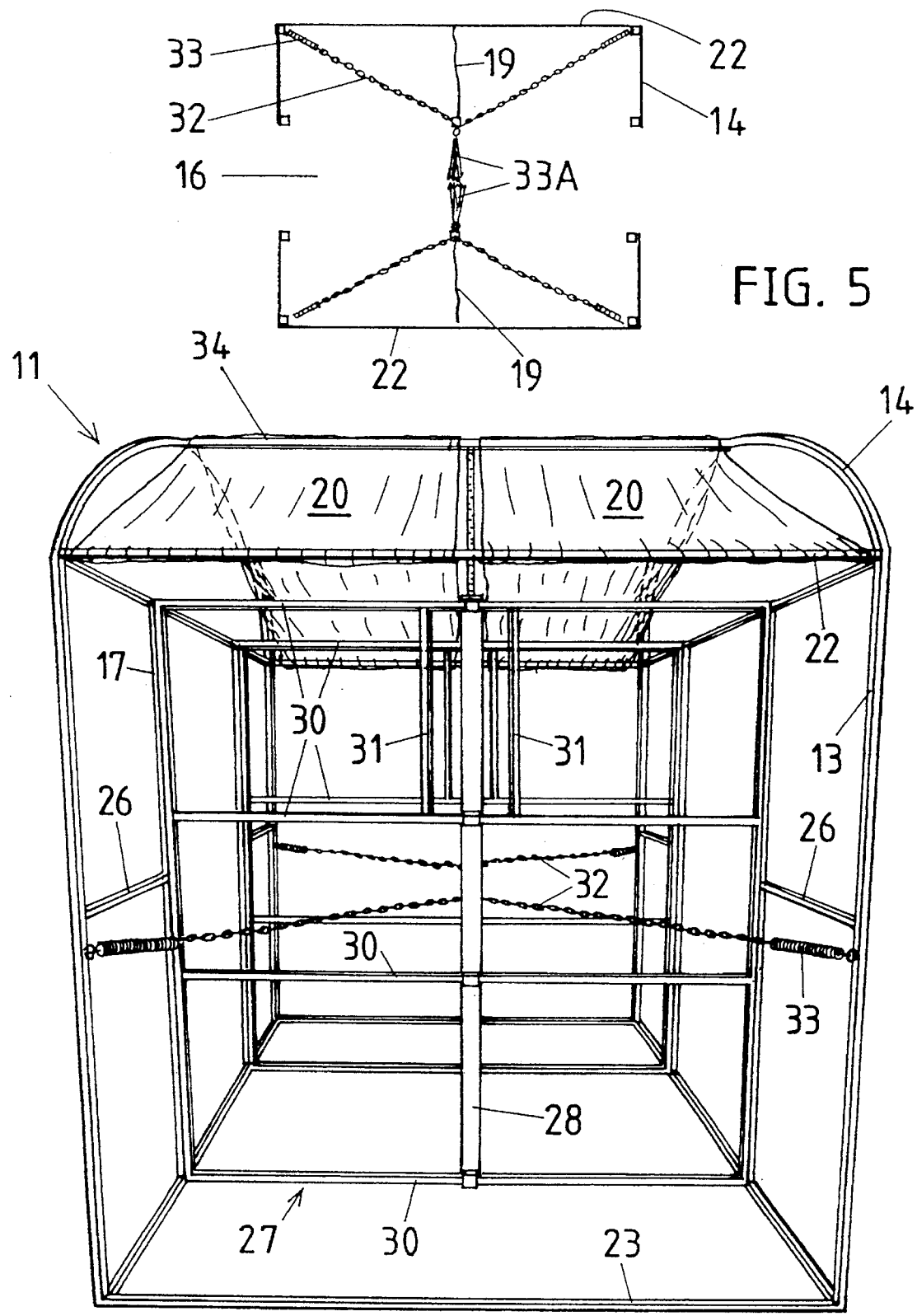
FIG. 4 is a side perspective view of the insect trap from below.
FIG. 5 is a schematic plan view of the insect trap of FIG. 4 from above omitting the roof structure for clarity.

In FIG. 4 there is also shown additional frame members 26, intermediate transverse frames 27 of trap 10 each including a central upright 28, opposed frame members 17 and horizontal frame members 30. There are also included retaining members 31 for top brush assemblies 37A which are described hereinafter. There is also shown cables or chains 32 which are each attached to vertical frame members 13 and uprights 28 via springs 33 so as to bias side brush assemblies 33A to a normal or closed position blocking accessway 16 as hereinafter described.

In FIG. 5 the arrangement of the retaining cables 32 is shown in conjunction with partitions 19 and opposed vertical brush assemblies 33A.

In FIG. 6 the spacing or gaps 25 are also shown between ceiling sheets 20 and partition 19 as well as gap 22A between ceiling sheet 20 and adjacent end frame 12 which is also shown in more detail in FIG. 7. The retaining strip 21 has been omitted for purpose of clarity.

In FIG. 8 each ceiling sheet 20 is shown which passes over a top frame member 34 also shown in FIGS. 1 and 4. Each ceiling sheet 20 also forms an attachment sleeve 35 for attachment to associated frame members 22 also shown in FIGS. 1 and 4. Also shown are support members 37 for ceiling sheets 20.

In FIG. 9 the brush means may comprise a pair of opposed side brush assemblies 33A comprising a plurality of sub-assemblies 33B. Each sub-assembly 33B include an array of filaments 34A each with associated support strip 35A and separated from each other by spaces 36A. There also may be provided a top brush assembly 37A including support strip 38. Support strip 38 is tubular as shown in FIG. 10 and may engage with an associated spigot 39 of clamp 40 which also includes upright tubular component 41 and grub screw 42 having handle 43 which enables clamp 40 to engage an associated frame member 31 in a desired position relative to the height of a particular animal. Thus clamp 40 may be slidely engaged with frame members 31 and are adjustable in height.

Figure 11:
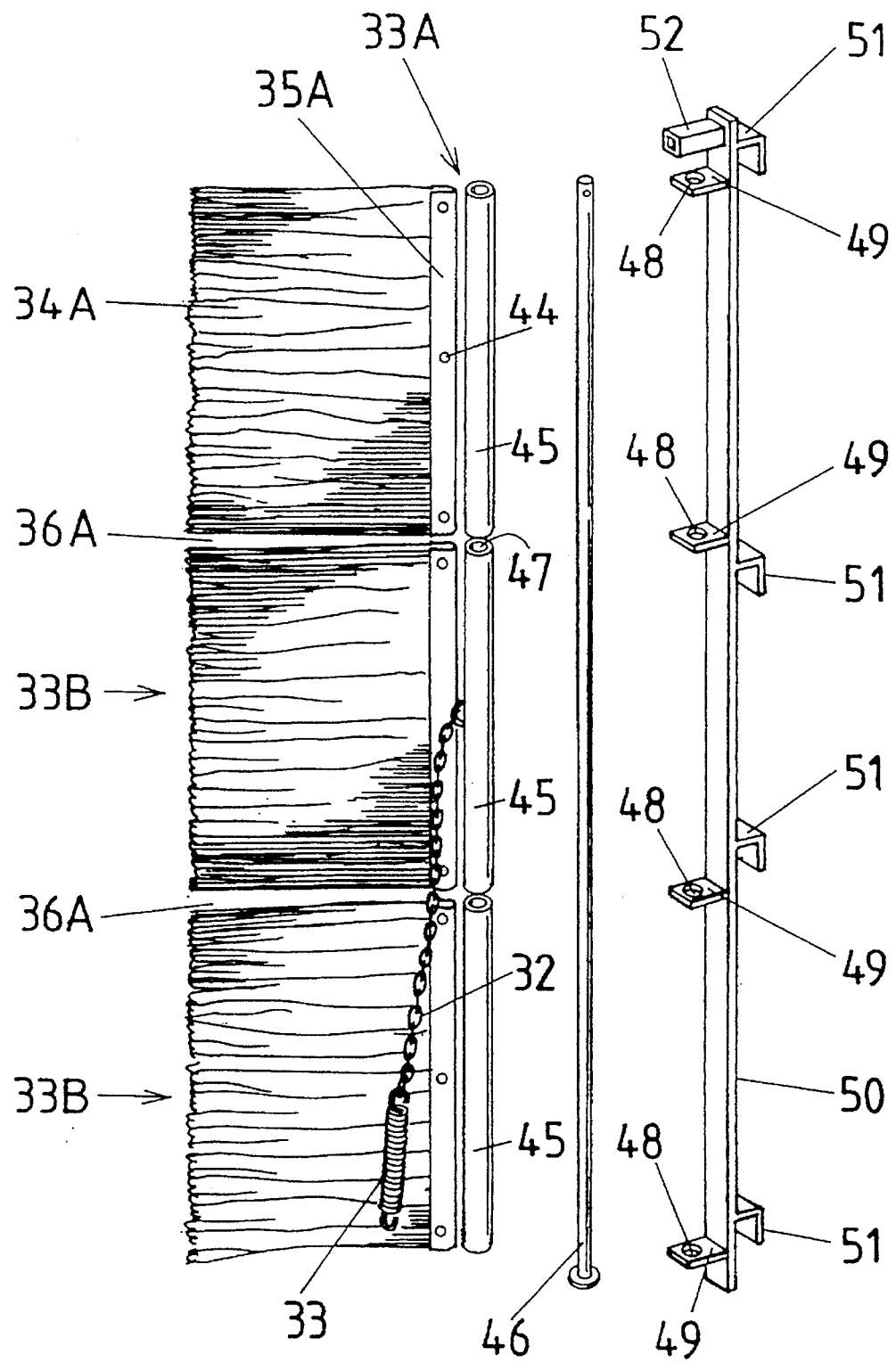
FIG. 11 is an exploded perspective view showing the attachment of a side brush ho its associated mounting structure.

In FIG. 11 the side brush assembly 33A is shown in detail with fastenings 44 attaching an array of filaments 34A to support strips 35A. There is also provided an array of associated tubular members 45 forming an upright 28 as described previously to which retaining cable 32 is attached. Also provided is an internal rod 46 which may be inserted in the internal spaces or bores 47 of tubular members 45 and which also may be passed through apertures 48 located in outwardly extending lugs 49 of support post 50 which may be retained in desired location upon horizontal frame members 30 by use of retaining projections 51. Also provided are retaining lugs 52 for spacer bar 53 bosh shown in FIG. 12.

Figure 12:
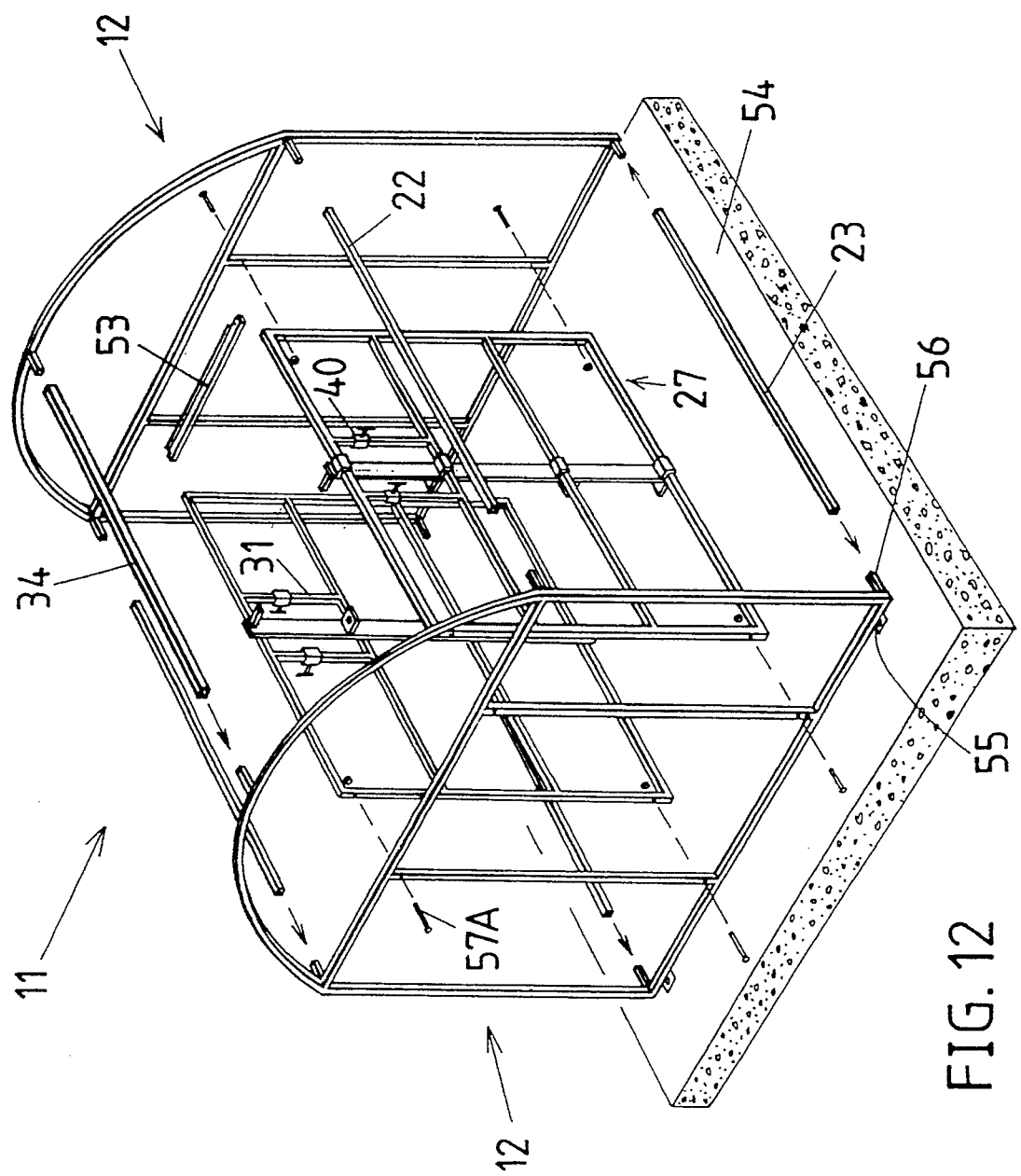
FIG. 12 is an exploded perspective view of the frame of the insect trap.

In the exploded perspective view shown in FIG. 12 the frame 11 is retained in a fixed position upon a concrete slab 54 by bolts (not shown) passing through retaining lugs 55. Each end frame 12 is shown having spigots 56 for engagement with associated horizontal longitudinal frame members 22, 23 and 34. Each of frames 27 may be attached to end frames 12 by fasteners 57A.

In operation the insect trap as shown in the preferred embodiment has been shown to provide practical advantages of the prior art. An animal may pass through either accessway 16 and approach opposed brush assemblies 33A which contact the sides of the animal as well as the pair of top brush assemblies 37A which are adjustable in height as described previously and which contact the back of the animal. The flies are then caused to fly to the top of the insect trap 10 because they are attracted by the light and therefore may enter into spaces 57 between ceiling sheets 20 and outer skin 18. The access to spaces 57 is through access gaps 22A and 25 described previously and once the flies have reached the confines of spaces 57 they cannot escape as is the case if the insect trap did not possess ceiling sheets 20 because of the relative narrow dimensions of spaces 22A and 25. The path of the flies is best shown by arrows in full outline in FIG. 6. Once trapped inside spaces 57 the flies subsequently die thorough dehydration and desiccation and thus insect traps of the invention are commercially more efficient than fly traps of U.S. Pat. No. 5,205,063.

Spaces 57 are bounded by partitions 19 and external skin 18 which contacts each end frame 12 as well as opposed arcuate frame members 14 and provides an effective heat trap as described above. Each space 57 may be in the shape of a sleeve or tube of any suitable cross sectional shape and having relatively narrow or restricted entrances for flies such as gaps 22A or 25 described above. The size of gaps 22A or 25 may be 1.5 mm–3.0 mm and more suitably 2 mm.

While the invention may include within its scope restricted access passages 22A and/or 25, it is pointed out restricted access passages 22A may be omitted because of the flies having a natural tendency to move away from the animal upon approaching dark filaments 34A and partitions 19 and thus move upwardly to enclosed space 57 and gain access thereto through access passages 25. However it will also be appreciated that the access passages may also be provided in other locations e.g. adjacent longitudinal frame members 22.

FIGS. 13 and 14 illustrate the effect of the presence of ceiling sheets or panels 20 in an insect trap to provide a "false ceiling" compared with traps without a "false ceiling" such as for example described in U.S. Pat. No. 5,205,063. Thus, as shown in FIG. 13, the temperature within the lower portion of the trap remains substantially the same whether or not the ceiling is installed whereas, as shown in FIG. 14, the temperature within the enclosed space 57 is enhanced by 1° to 4° C. depending on the time of day, with the increased temperature effect starting around 7 am, reaching a peak around 8 am and lasting until 3 pm before trailing off around 5 pm. On hot days, flies within the enclosed space 57 die very rapidly.

An unexpected effect of the false ceiling appears to be that it causes flies to move more readily towards the sides of the trap and then vertically up the inside surface of skin 18 towards the enclosed space 57, such that their confinement within space 57 is accelerated, reducing the escape of flies from the trap through the entrance. It is thought that this effect may be the result of subtle lighting or shading effects produced by the transparent or translucent material of ceiling sheets 20.

The size of enclosed space 57 is not critical, it being required merely that the space be sufficient to achieve the increased heating effect. Nor is it essential that the false ceiling be structured as illustrated that is, the invention includes within its scope other constructions which will provide an enclosed space that is operable to trap and desiccate flies in a similar manner to the space 57 shown in the preferred embodiment.

While there is shown and described the present preferred embodiment of the invention, it is to be distinctly understood that this invention is not limited thereto, but may be variously embodied to practice within the scope of the following claims.

We claim:

1. An insect trap including a housing having a support frame; a skin of flexible transparent or translucent material attached to and substantially covering the support frame to thereby provide a housing interior which is substantially totally exposed to sunlight; a walk through passage extending through the housing interior, brush means forming a dense curtain in said walk through passage for brushing flies off an animal passing through said housing interior in said walk through passage and one or more ceiling sheets or panels located in said housing which are spaced from said flexible skin to define an enclosed space which functions as a heat trap for insects, said enclosed space having at least one access passage, at least one of which is restricted in dimensions compared to said enclosed space and is formed by a narrow gap located between said one or more ceiling sheets or panels and at least a portion of said flexible skin whereby insects parted from said animal by said brush means are attracted to said heat trap through said at least one access passage for subsequent desiccation after exposure to sunlight passing through the flexible skin.

2. An insect trap as claimed in claim 1 wherein the flexible skin is spaced from said walk through passage to provide an internal spacing in said housing interior with at least one partition located in said inner spacing.

3. An insect trap as claimed in claim 2 wherein said another of said at least one access passage is located adjacent said partition and forms another narrow gap bounded by said partition and said one or more ceiling sheets or panels.

4. An insect trap as claimed in claim 2, wherein said at least one partition is formed from transparent or translucent material.

5. An insect trap as claimed in claim 2, wherein said at least one partition is formed from dark or black material.

6. An insect trap as claimed in claim 2, wherein said internal spacing is formed between an outer row of peripheral uprights and an inner row of uprights.

7. An insect trap as claimed in claim 6, wherein said brush means is located in said housing so that said brush means substantially occupies said walk through passage at at least one location intermediate opposite ends of said walk through passage.

8. An insect trap as claimed in claim 7, wherein said brush means is adjacent said at least one partition.

9. An insect trap as claimed in claim 7, wherein said brush means comprises a plurality of monofilaments.

10. An insect trap as claimed in claim 1 wherein the brush means is formed from dark material in contrast to said flexible skin.

11. An insect trap as claimed in claim 1, wherein the support frame includes a pair of outer rows of peripheral uprights to which said flexible skin is attached.

12. An insect trap as claimed in claim 11, wherein there is provided a pair of inner rows of uprights which define said walk through passage.

13. An insect trap as claimed in claim 12, wherein there is provided a first array of monofilaments for contacting the back on an animal passing through said walk through passage, and a second array of monofilaments for contacting the sides and upper body of the animal.

* * * * *